(12) United States Patent
Yale

(10) Patent No.: US 11,551,208 B2
(45) Date of Patent: Jan. 10, 2023

(54) SYSTEMS AND METHODS FOR POINT-TO-POINT ENCRYPTION COMPLIANCE

(71) Applicant: VeriFone, Inc., San Jose, CA (US)

(72) Inventor: Scott Raymond Yale, El Cajon, CA (US)

(73) Assignee: VERIFONE, INC., Wilmington, DE (US)

( * ) Notice: Subject to any disclaimer, the term of this patent is extended or adjusted under 35 U.S.C. 154(b) by 1042 days.

(21) Appl. No.: 16/151,846

(22) Filed: Oct. 4, 2018

(65) Prior Publication Data

US 2020/0111090 A1 Apr. 9, 2020

(51) Int. Cl.
*G06Q 20/38* (2012.01)
*G06F 21/60* (2013.01)
*G06Q 20/32* (2012.01)

(52) U.S. Cl.
CPC ....... *G06Q 20/3829* (2013.01); *G06F 21/602* (2013.01); *G06Q 20/326* (2020.05); *G06Q 2220/00* (2013.01)

(58) Field of Classification Search
CPC ... G06Q 20/3829; G06Q 20/204; G06Q 20/20
See application file for complete search history.

(56) References Cited

U.S. PATENT DOCUMENTS

| | | | |
|---|---|---|---|
| 4,259,720 A | 3/1981 | Campbell | |
| 5,265,033 A | 11/1993 | Vajk et al. | |
| 5,960,086 A | 9/1999 | Atalla | |
| 6,085,168 A | 7/2000 | Mori et al. | |
| 6,609,658 B1 | 8/2003 | Sehr | |
| 7,051,001 B1 | 5/2006 | Slater | |

(Continued)

FOREIGN PATENT DOCUMENTS

| | | |
|---|---|---|
| CA | 2921223 | 2/2015 |
| CN | 107292606 | 10/2017 |

(Continued)

OTHER PUBLICATIONS

Mavrovouniotis, S., Ganley, M. (2014). Hardware Security Modules. In: Markantonakis, K., Mayes, K. (eds) Secure Smart Embedded Devices, Platforms and Applications. Springer, New York, NY. https://doi.org/10.1007/978-1-4614-7915-4_17.*

(Continued)

*Primary Examiner* — Steven S Kim
(74) *Attorney, Agent, or Firm* — Bond, Schoeneck & King, PLLC

(57) ABSTRACT

Systems and methods for point-to-point encryption compliance are disclosed. In one embodiment, in an information processing apparatus comprising at least one computer processor, a method for point-to-point encryption compliance may include: (1) a payment application receiving, from a data source, payment data encrypted using a first encryption method; (2) the payment application identifying a second encryption method for the payment data; (3) the payment application requesting, from the data source, the payment data encrypted using the second encryption method; and (4) the payment application receiving from the data source, the payment data encrypted using the second encryption method.

20 Claims, 2 Drawing Sheets

(56) References Cited

U.S. PATENT DOCUMENTS

| | | | |
|---|---|---|---|
| 7,328,453 B2 | 2/2008 | Merkle et al. | |
| 7,784,684 B2 | 8/2010 | Labrou et al. | |
| 8,041,633 B2 | 10/2011 | Knowles et al. | |
| 8,116,734 B2 | 2/2012 | Vawter | |
| 8,328,095 B2 | 12/2012 | Oder et al. | |
| 8,346,671 B2 | 1/2013 | Zloth et al. | |
| 8,417,643 B2 | 4/2013 | Mardikar | |
| 8,571,995 B2 | 10/2013 | Spies et al. | |
| 8,606,720 B1 | 12/2013 | Baker et al. | |
| 8,620,824 B2 | 12/2013 | Reno | |
| 9,195,982 B2 | 11/2015 | Orr et al. | |
| 9,294,268 B2 | 3/2016 | Meuller | |
| 10,748,146 B2* | 8/2020 | Carr | G06Q 20/40 |
| 10,789,373 B2* | 9/2020 | Reid | H04L 9/3231 |
| 11,233,830 B2* | 1/2022 | Yale | G06Q 20/385 |
| 2004/0015451 A1* | 1/2004 | Sahota | H04W 12/02 |
| | | | 705/71 |
| 2005/0084100 A1 | 4/2005 | Spies et al. | |
| 2006/0224470 A1 | 10/2006 | Ruano et al. | |
| 2006/0271496 A1 | 11/2006 | Balasubramanian et al. | |
| 2007/0276765 A1* | 11/2007 | Hazel | G07F 7/1016 |
| | | | 705/71 |
| 2008/0189214 A1 | 8/2008 | Mueller | |
| 2008/0283590 A1* | 11/2008 | Oder, II | G06Q 20/401 |
| | | | 235/380 |
| 2009/0106160 A1* | 4/2009 | Skowronek | G06Q 20/401 |
| | | | 705/75 |
| 2009/0150295 A1* | 6/2009 | Hatch | G06Q 20/3552 |
| | | | 705/76 |
| 2009/0222383 A1* | 9/2009 | Tato | H04L 9/3228 |
| | | | 705/35 |
| 2010/0121767 A1* | 5/2010 | Coulter | G06Q 20/401 |
| | | | 705/17 |
| 2010/0161494 A1 | 6/2010 | Slater | |
| 2010/0169223 A1 | 7/2010 | Yuan | |
| 2011/0231272 A1 | 9/2011 | Englund et al. | |
| 2011/0238511 A1* | 9/2011 | Park | G06Q 20/3823 |
| | | | 705/17 |
| 2012/0039469 A1* | 2/2012 | Mueller | H04L 63/0428 |
| | | | 380/252 |
| 2012/0166343 A1* | 6/2012 | Carapelli | G06Q 20/382 |
| | | | 705/64 |
| 2012/0317018 A1 | 12/2012 | Barnett | |
| 2013/0254117 A1 | 9/2013 | Von Mueller et al. | |
| 2013/0297511 A1 | 11/2013 | Monk | |
| 2014/0046786 A1 | 2/2014 | Mazaheri et al. | |
| 2014/0222545 A1 | 8/2014 | Hajji | |
| 2015/0052062 A1 | 2/2015 | Flomin et al. | |
| 2015/0095225 A1 | 4/2015 | Appana et al. | |
| 2015/0287031 A1 | 10/2015 | Radu et al. | |
| 2015/0363771 A1* | 12/2015 | Graylin | G06Q 20/409 |
| | | | 705/65 |
| 2016/0210626 A1 | 7/2016 | Ortiz et al. | |
| 2016/0224950 A1 | 8/2016 | Attar | |
| 2017/0300899 A1* | 10/2017 | Balaga | G06Q 20/382 |
| 2019/0066102 A1* | 2/2019 | Powell | G07F 7/1091 |

FOREIGN PATENT DOCUMENTS

| | | |
|---|---|---|
| EP | 2962262 | 1/2016 |
| GB | 2470281 | 11/2010 |
| GB | 2482664 | 2/2012 |
| WO | WO 2013103991 | 7/2013 |
| WO | WO 2015153277 | 10/2015 |
| WO | 2016131056 | 8/2016 |

OTHER PUBLICATIONS

J. Stapleton and R. Poore, "Cryptographic transitions," 2006 IEEE Region 5 Conference, 2006, pp. 22-30, doi: 10.1109/TPSD.2006.5507465.*

European Search Report, dated Dec. 18, 2019, from corresponding European Patent Application No. 19 19 6634.0.

Voltage Security, Inc., "*Payment Security Solution—Processor Edition*", Mar. 26, 2013, pp. 1-7.

U.S. Appl. No. 15/982,434, filed May 2018, Yale et al.

European Office Action, EP Application No. 19196634.0, pp. 1-8, dated Nov. 9, 2021.

* cited by examiner

SYSTEMS AND METHODS FOR POINT-TO-POINT ENCRYPTION COMPLIANCE

BACKGROUND OF THE INVENTION

1. Field of the Invention

The present disclosure relates generally to input devices, and more particularly to systems and methods for point-to-point encryption compliance.

2. Description of the Related Art

For a point of interaction device, such as a point of sale device, to be compliant with PCI Security Standards Council, LLC's point-to-point encryption (P2PE) security requirements, any point between the secure end points must never receive or send clear-text account data.

SUMMARY OF THE INVENTION

Systems and methods for point-to-point encryption compliance are disclosed. In one embodiment, in an information processing apparatus comprising at least one computer processor, a method for point-to-point encryption compliance may include: (1) a payment application receiving, from a data source, payment data encrypted using a first encryption method; (2) the payment application identifying a second encryption method for the payment data; (3) the payment application requesting, from the data source, the payment data encrypted using the second encryption method; and (4) the payment application receiving from the data source, the payment data encrypted using the second encryption method.

In one embodiment, at least one digit in the payment data may be unencrypted, and the payment application may identify the second encryption method based on the at least one unencrypted digit. The unencrypted digit may be part of a bank identification number in the payment data.

In one embodiment, the method may further include the payment application providing the payment data encrypted using the first encryption method to a payment authorization platform.

In one embodiment, the method may further include the payment application providing the payment data encrypted using the second encryption method to a third party platform.

In one embodiment, the payment data and the payment data encrypted using the first encryption method may have the same number of digits.

In one embodiment, the request for the payment data encrypted using the second encryption method may include the payment data encrypted using the first encryption method.

In one embodiment, the request for the payment data encrypted using the second encryption method may include an identifier for the second encryption method.

In another embodiment, in an information processing apparatus comprising at least one computer processor, a method for point-to-point encryption may include: (1) receiving, from a payment data reader, payment data; (2) encrypting the payment data using a first encryption method; (3) providing the payment data encrypted using the first encryption method to a payment application; (4) receiving a request from the payment application to provide the payment data encrypted using a second encryption method; (5) encrypting the payment data using the second encryption method; and (6) providing the payment data encrypted using the second encryption method to the payment application.

In one embodiment, at least one digit in the payment data may be unencrypted.

In one embodiment, the payment data and the payment data encrypted using the first encryption method may have the same number of digits.

In one embodiment, computer processor may include a cryptographic processor.

In one embodiment, the request for the payment data encrypted using the second encryption method may include an identifier for the second encryption method.

In one embodiment, the request for the payment data encrypted using the second encryption method may include the payment data encrypted using the first encryption method.

In one embodiment, the method may further include retrieving unencrypted payment data associated with the payment data encrypted using the first encryption method from secure storage; and encrypting the retrieved payment data using the second encryption method.

In one embodiment, the first encryption method may encrypt at least a portion of the payment data using a first key. The second encryption method may encrypt at least a portion of the payment data using a second key.

In one embodiment, the second encryption method may replace at least a portion of the payment data with dummy data, with random data, etc.

In one embodiment, the method may further include providing a security packet with the payment data encrypted using the first encryption method to the payment application.

In one embodiment, the second encryption method may be identified and/or decided by the payment application. For example, the payment application may know in advance which encryption method and key is needed for the particular third party platform.

In one embodiment, the payment application may send all transactions to the third party platform using a known second encryption method. In another embodiment, the payment application may send only certain transactions to the third party platform based on, for example, the bank identification number, using a second encryption method.

In one embodiment, multiple second encryption methods and keys may be used. For example, a key slot may be needed for each second encryption method. The payment application may identify the second encryption method and the key (e.g., key slot) to use.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

If an application outside of the secure end points is required to send account data using a different encryption technique than the one that was used to send the account data initially, there is currently no process that exists that would allow compliance with the end-to-end encryption standard. For example, if payment application is needed to send payment data to two different destinations and were allowed to decrypt the encrypted account data, and re-encrypt it to meet different formatting needs for different data destinations, the point-to-point encryption security requirements would be compromised. The only solution is to include the payment application within one of the secure end-points within the point-to-point encryption scheme. This complicates the design of the system and compliance with the end-to-end encryption scheme.

Embodiments are directed to systems and methods for point-to-point encryption compliance.

Figure 1:
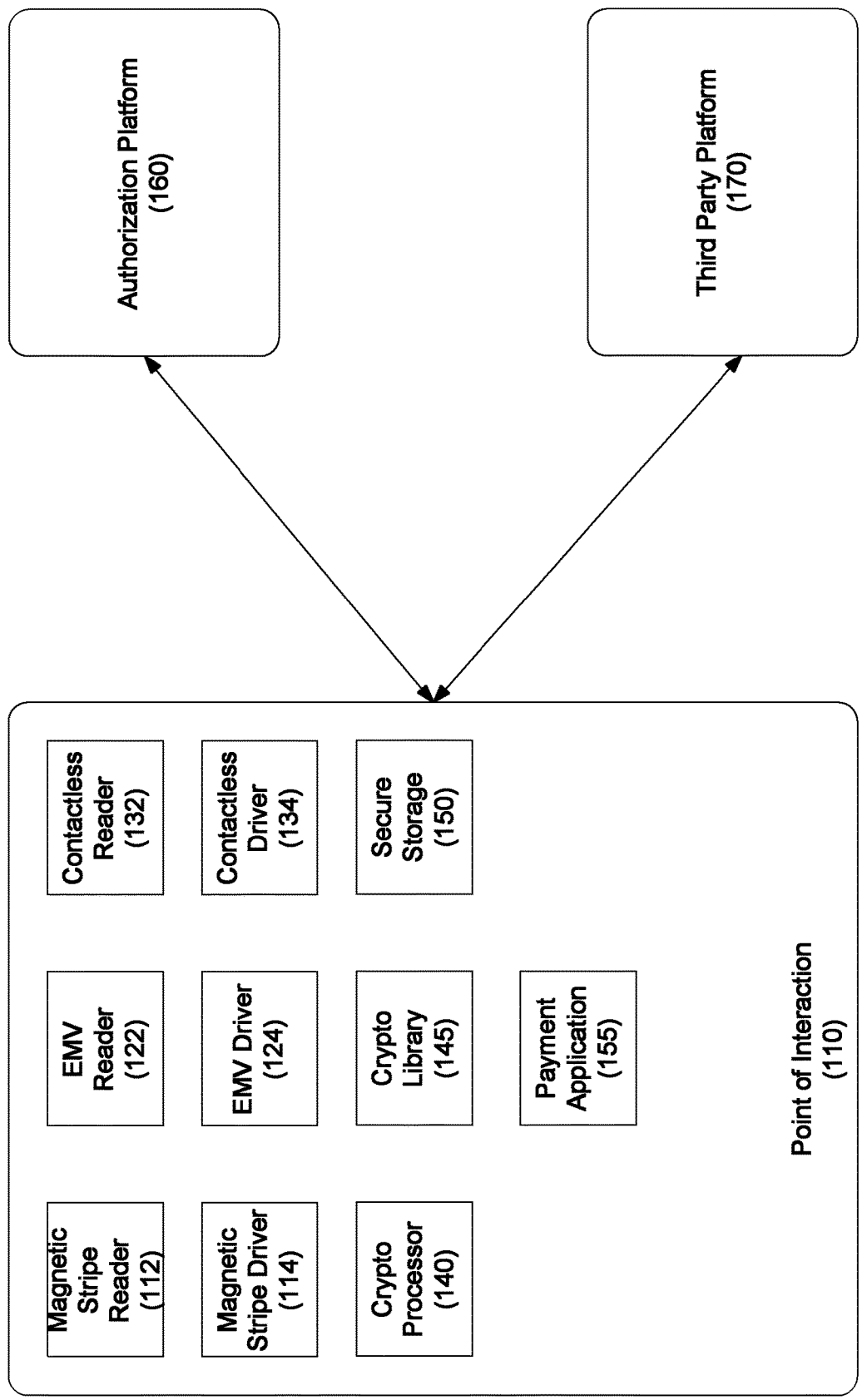
FIG. 1 depicts a system for point-to-point encryption compliance according to one embodiment.
Figure 2:
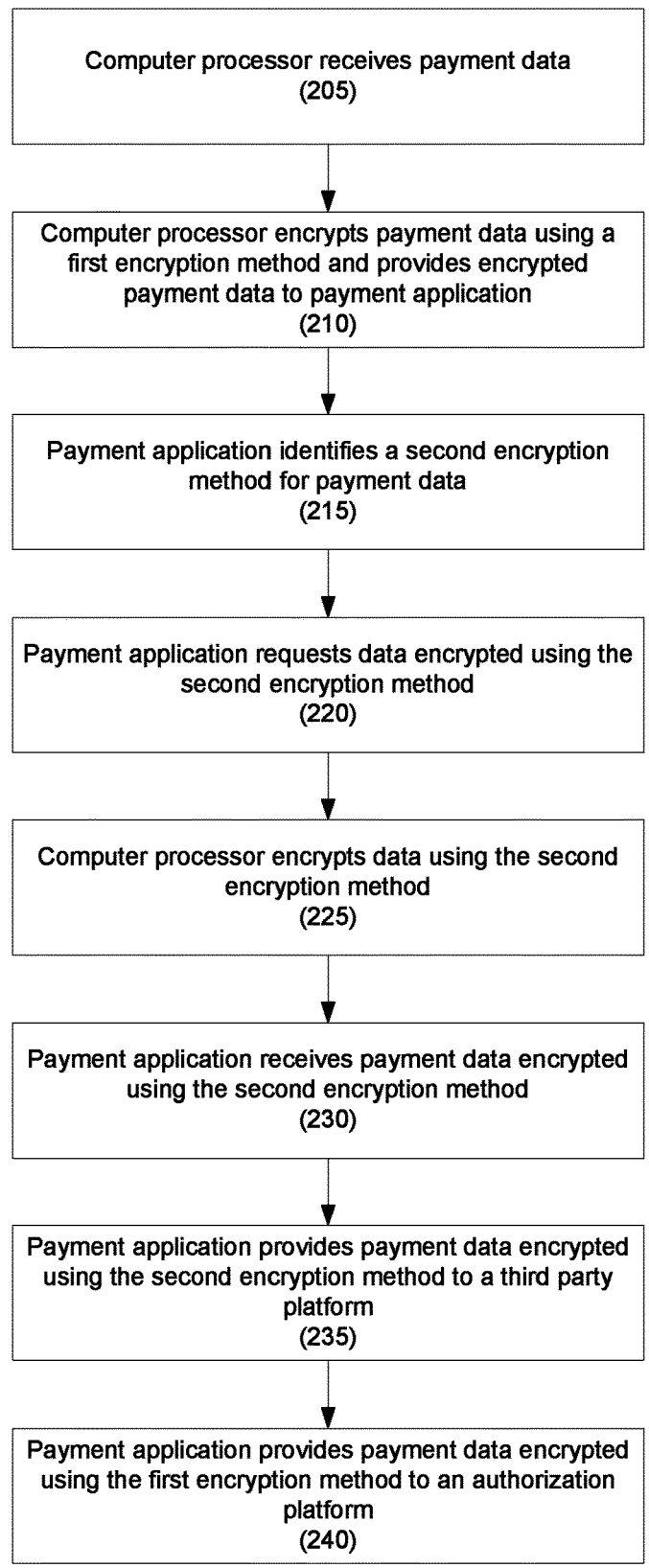
FIG. 2 depicts a method for point-to-point encryption compliance according to one embodiment.

Several embodiments of the present invention and their advantages may be understood by referring to FIGS. 1-2.

The disclosure of U.S. Provisional Patent Application Ser. No. 62/657,294 and U.S. patent application Ser. No. 15/982,434 are hereby incorporated by reference in their entireties.

In embodiments, the same processor (e.g., the cryptographic processor) may encrypt the payment data using the first encryption method and the second encryption method.

In embodiments, the payment application may determine if the payment data it receives is encrypted by examining the payment data received. The payment application does not know, nor is it required to know, whether the payment data it received was encrypted or not when requesting that the data be provided encrypted using a second encryption algorithm.

Referring to FIG. 1, a system for point-to-point encryption compliance is disclosed according to one embodiment. The system may include point of interaction device 110, which may be any suitable point of sale device, including, for example, a PIN pad, terminal, mobile point of sale device, etc. Point of interaction device 110 may include magnetic stripe reader 112 and magnetic stripe driver 114 for reading and processing magnetic stripe data from a payment card. This payment data may include, for example, Track I and Track II data. Point of interaction device 110 may further include EMV reader 122 and EMV driver 124 for reading and processing EMV data from an EMV-enabled (i.e., chip) payment card. In one embodiment, the payment data from the EMV-enabled payment card may not be in a Track I and Track II format, so EMV driver 124 may reformat the payment data received from the EMV-enabled payment card to be in Track I and Track II format.

Point of interaction device 110 may further include contactless reader 132 and contactless driver 134 for reading and processing contactless data from a contactless-enabled payment card, an electronic device (e.g., smartphone, Internet of Things (IoT) appliance, etc.), a fob, etc. If necessary, in one embodiment, the payment data received from contactless reader 132 may not be in a Track I and Track II format, so contactless driver 134 may reformat the payment data to be in that format.

Any other suitable interface/reader and/or driver may be provided as is necessary or desired. For example, point of interaction device 110 may further include a reader (not shown) to receive optical, machine readable codes (e.g., QR codes, bar codes, etc.). The reader may also be embodied as a separate reader, or may be integrated with other readers, such as the contactless reader 132.

Point of interaction device 110 may further include cryptographic processor 140, which may receive and process payment data from magnetic stripe driver 114, EMV driver 124, and/or contactless driver 134. In one embodiment, cryptographic processor 140 may store payment data from magnetic stripe driver 114, EMV driver 124, and contactless driver 134 in secure storage 150.

In one embodiment, secure storage 150 may be storage that may only be accessible by secure modules with the operating system for point of interaction device 110 (e.g., cryptographic processor 140, magnetic stripe reader 112, EMV reader 122, contactless reader 132, etc.). In one embodiment, secure storage 150 may be a physically separate, secure, storage element. In another embodiment, secure storage 150 may be part of a storage element that is partitioned by software to be secure.

In one embodiment, magnetic stripe reader 112 and driver 114, EMV reader 122 and driver 124, and contactless reader 132 and driver 134, cryptographic processor 140, secure storage 150, and payment application 155 may be in the same point of interaction device. In one embodiment, any or all of magnetic stripe reader 112 and driver 114, EMV reader 122 and driver 124, and contactless reader 132 and driver 134 may be located externally from point of interaction device.

In one embodiment, after the payment data is read, the payment information may be stored in secure storage 150. Cryptographic processor 140 may retrieve the payment data from secure storage 150, or it may receive payment data from a read driver, such as magnetic stripe driver 114, EMV driver 124, or contactless driver 134. After it receives the payment data, cryptographic processor 140 may encrypt some or all of the payment data using a first encryption method and may provide the encrypted payment data to payment application 155. In one embodiment, the payment data may be encrypted using a first key and first encryption method from cryptographic library 145 that may be included within point of interaction device 110, for example, within secure storage 150.

In another embodiment, some or all of the payment data may be masked or replaced with random digits, dummy digits, etc. As used herein, "encryption" may refer to encryption with a key, or it may refer to the replacement or masking of digits with dummy or random numbers, or both.

In one embodiment, the encrypted payment data may retain the same format as the unencrypted payment data. For example, the encrypted payment data may have the same number of digits as the unencrypted payment data.

In one embodiment, the encrypted payment data may comprise one or more digits that may not be encrypted. For example, a typical credit card number includes sixteen digits. The first six of these digits comprise the Bank Identification Number, or BIN. In embodiments, some or all of the BIN may not be encrypted, such that the encrypted payment data includes both the unencrypted BIN digits and the digits of the credit card number. The number of digits of the BIN that are not encrypted may be selected as is necessary and/or desired. The unencrypted BIN digits may be used for routing purposes.

In one embodiment, the digit(s) that are not encrypted may be selected so that they are sufficient to identify a second encryption method to be used to encrypt the payment data.

In embodiments, the unencrypted payment data may comprise the last four digits, or any other suitable digits, of the credit card number that are not encrypted.

In one embodiment, the encrypted payment data may preserve the credit card format of sixteen digits. Further, in the encrypted payment data the first six digits and the last four digits may be the same as the first six digits and the last four digits of the payment data, but the middle six digits of the payment data may be encrypted represented by another six digits. It will be appreciated that any number of the credit card digits may be encrypted in this manner while preserving the sixteen digit format.

Payment application 155 may receive encrypted payment data from cryptographic processor 140. In one embodiment, payment application 155 may also receive additional data, such as a security packet, with the encrypted payment data.

In one embodiment, the security packet may include a cryptogram for the payment data and additional information. The security packet may further include identifying information for the point of interaction device (e.g., serial number) and any additional information as is necessary and/or desired.

Payment application 155 may optionally identify the payment data as encrypted, and may identify whether the encrypted payment data should be encrypted using a second encryption method for one or more third party platform. In one embodiment, payment application 155 may base this on at least one digit in the encrypted payment data that may be unencrypted (e.g., a digit of the BIN). In another embodiment, payment application 155 may base this on other data that may be included with the encrypted payment data (e.g., a flag or other identifier). In still another embodiment, payment application 155 may send some, or all, transactions to the third party platform.

In one embodiment, payment application 155 may retrieve an identifier for the second encryption method, and may provide the identifier to cryptographic processor 140. For example, payment application 155 may identify the key and encryption algorithm based on a key label, a key slot number, etc.

In another embodiment, payment application 155 may not provide an identifier for the second encryption method, and cryptographic processor 140 may use a default encryption method for the second encryption method.

In one embodiment, payment application 155 may request that cryptographic processor 140 provide the payment data encrypted using a second encryption method for third party platform 170 by sending a message to the cryptographic processor 140 that includes the encrypted payment data. For example, cryptographic processor 140 may use the encrypted payment data to obtain the clear payment data by, for example, decrypting the encrypted payment data. Cryptographic processor may also use the encrypted payment data that is encrypted using the first encryption method to identify stored unencrypted payment data (e.g., in secure storage 150) or otherwise accessible unencrypted payment data that corresponds to the encrypted payment data.

Cryptographic processor 140 may then encrypt the unencrypted payment data using the appropriate encryption algorithm that results in encrypted payment data for use by the third party platform 170.

Third party platform 170 may provide additional services associated with the transaction, such as processing reward points, paying with reward points, loyalty programs, store credit card (e.g., private label card) applications, financing options, etc.

Referring to FIG. 2, a method for point-to-point encryption compliance is disclosed according to one embodiment.

In step 205, a data source including a computer processor (e.g., a cryptographic processor) in a point of interaction device may receive payment data. For example, the cryptographic processor may receive payment data from a card reader, a magnetic stripe reader, an EMV reader, a contactless reader, QR code reader, barcode scanner, or any other suitable reader.

In one embodiment, the received payment data may be stored, for example, in secure storage.

In step 210, the computer processor may encrypt some or all of the payment data using a first encryption method and may provide the encrypted payment data to a payment application. For example, the payment data may be encrypted using a first encryption method and a first key. In one embodiment, the payment data may be encrypted in a manner to preserve the format of the received payment data, such that the encrypted payment data has the same number of digits as the unencrypted payment data.

As noted above, the first encryption method may include masking or replacing certain digits of the payment data with dummy or random digits.

In one embodiment, the encrypted payment data may include some unencrypted payment data, such as one or more digits in the BIN, the last four digits of the account number, etc., that may be used to route the encrypted payment data to a destination. In one example, encrypted payment data may be generated by encrypting certain digits of the payment data, such that resulting encrypted data has the same number of digits as was encrypted (e.g., if six digits of the payment data are encrypted, the result of the encryption of those digits is six digits), and then the encrypted digits may replace the certain digits such that the format of the payment data is preserved (e.g., if the middle six digits of the payment data is encrypted into a six digit result, the six digit result will then replace the six digits of the payment data that were encrypted, thereby creating the encrypted payment data).

In one embodiment, additional data, such as a security packet, a flag or other identifier, etc. may be provided to the payment application as is necessary and/or desired. A security packet may include encrypted data corresponding to masked or replaced digits.

In step 215, the payment application may use some of the unencrypted payment data, or some other identifier, to identify a second encryption method for the payment data. For example, the payment application may identify at least one digit in the BIN, which may not be encrypted, to identify the second encryption method. Other manners of identifying the second encryption method may be used as is necessary and/or desired.

In step 220, the payment application may request that the computer processor encrypt the payment data using the second encryption method. For example, the payment data may be encrypted using a second encryption method and a second key.

In one embodiment, a payment authorization platform and/or a third party platform may request that the payment application provide the payment data encrypted using the second encryption method.

In one embodiment, the payment application may retrieve an identifier for the second encryption method, and may provide the identifier to the computer processor. For example, the payment application may identify the key and encryption algorithm based on a key label, a key slot number, etc.

In step 225, the computer processor may encrypt the payment data using the second encryption method. In one embodiment, the computer processor may use the encrypted payment data to obtain the unencrypted payment data by, for example, decrypting the encrypted payment data. The computer processor may also use the encrypted payment data to identify stored unencrypted payment data (e.g., in secure storage) or otherwise accessible unencrypted payment data that is associated with the encrypted payment data.

In step 230, the payment application may receive the payment data encrypted using the second encryption method.

In step 235, the computer processor may provide the payment data encrypted using the second encryption method to, for example, a third party platform. The third party platform may process the payment data encrypted using the second encryption method by, for example, contacting the issuer, reward or loyalty provider, etc. In one embodiment, the third party platform may return instructions to the payment application (e.g., a rewards point balance, an option to pay with points, etc.).

In step 240, the payment application may route the payment data encrypted using the first encryption method, for example, an authorization platform for authorization. In one embodiment, steps 235 and 240 may be executed in any suitable order, or in parallel, as is necessary and/or desired.

It will be appreciated by persons skilled in the art that the present invention is not limited by what has been particularly shown and described hereinabove. Rather the scope of the present invention includes both combinations and subcombinations of features described hereinabove and variations and modifications thereof which are not in the prior art. It should further be recognized that these embodiments are not exclusive to each other.

It will be readily understood by those persons skilled in the art that the embodiments disclosed here are susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for point-to-point encryption, comprising:
encrypting, by a data source comprising at least one computer processor in a point of interaction device, at least a portion of payment data using a first encryption method to obtain a first encrypted payment data;
receiving, by a payment application in the point of interaction device, from the data source the first encrypted payment data and identifying information, wherein the first encryption method involves replacing or masking at least one digit in the payment data with a dummy or random value;
identifying, by the payment application, a second encryption method for the received payment data based on the identifying information received from the data source with the first encrypted payment data, wherein the second encryption method is associated with a third party platform and the second encryption method is different than the first encryption method;
in response to identifying the second encryption method, sending, by the payment application, a first request for the payment data to be encrypted by the data source using the second encryption method, wherein the first request includes the first encrypted payment data;
in response to receiving the first request, obtaining, by the data source, the payment data by decrypting the first encrypted payment data or retrieving the payment data from a storage using the first encrypted payment data;
encrypting, by the data source, the payment data using the second encryption method to obtain a second encrypted payment data in response to obtaining the payment data;
receiving, by the payment application, the second encrypted payment data from the data source;
sending, by the payment application, a second request to the third party platform, wherein the second request includes the second encrypted payment data received from the data source; and
receiving, by the payment application, instructions from the third party platform based on processing of the second encrypted payment data.

2. The method of claim 1, wherein at least one digit in the first encrypted payment data received from the data source is unencrypted, and the payment application identifies the second encryption method based on the at least one unencrypted digit in the first encrypted payment data received from the data source.

3. The method of claim 2, wherein the at least one unencrypted digit is part of a bank identification number in the payment data received from the data source.

4. The method of claim 2, wherein the at least one unencrypted digit is part of a credit card number in the payment data received from the data source.

5. The method of claim 1, further comprising: providing, by the payment application, the first encrypted payment data to a payment authorization platform.

6. The method of claim 1, wherein the payment data and the first encrypted payment data have the same number of digits.

7. The method of claim 1, wherein the first request for the second encrypted payment data comprises an identifier for the second encryption method.

8. The method of claim 1, wherein the point of interaction device is a point of sale device.

9. The method of claim 1, wherein the payment data comprises Track I or Track II data.

10. The method of claim 1, wherein the at least one computer processor comprises a cryptographic processor.

11. A point of interaction device, comprising:
a data source comprising a first at least one computer processor programmed to obtain a first encrypted payment data by encrypting at least a portion of payment data using a first encryption method by replacing or masking at least one digit in the payment data with a dummy or random value;
a second at least one computer processor; and
a memory storing a payment application that, when executed by the second at least one computer processor, causes the second at least one computer processor to:
receive the first encrypted payment data and identifying information from the data source;
identify a second encryption method for the received payment data based on the identifying information, wherein the second encryption method is associated with a third party platform and the second encryption method is different than the first encryption method; and
in response to identifying the second encryption method, send a first request to the data source for the payment data to be encrypted by the data source using the second encryption method, wherein the first request includes the first encrypted payment data;

wherein in response to receiving the first request from the second at least one computer processor, the data source is configured to obtain the payment data by decrypting the first encrypted payment data or retrieving the payment data from a storage using the first encrypted payment data;

wherein the data source is further configured to encrypt the payment data using the second encryption method to obtain a second encrypted payment data in response to obtaining the payment data; and wherein the second at least one computer processor is further configured to
 receive the second encrypted payment data from the data source;
 send a second request to the third party platform, wherein the second request includes the second encrypted payment data received from the data source; and
 receive instructions from the third party platform based on processing of the second encrypted payment data.

12. The point of interaction device of claim 11, wherein at least one digit in the first encrypted payment data received from the data source is unencrypted, and the second at least one computer processor is configured to identify the second encryption method based on the at least one unencrypted digit in the first encrypted_payment data received from the data source.

13. The point of interaction device of claim 12, wherein the at least one unencrypted digit is part of a bank identification number in the payment data received from the data source.

14. The point of interaction device of claim 12, wherein the at least one unencrypted digit is part of a credit card number in the payment data received from the data source.

15. The point of interaction device of claim 11, wherein the second at least one computer processor is further configured to provide the first encrypted payment data to a payment authorization platform.

16. The point of interaction device of claim 11, wherein the payment data and the first encrypted payment data have the same number of digits.

17. The point of interaction device of claim 11, wherein the first request for the second encrypted_payment data comprises an identifier for the second encryption method.

18. The point of interaction device of claim 11, wherein the point of interaction device is a point of sale device.

19. The point of interaction device of claim 11, wherein the payment data comprises Track I or Track II data.

20. The point of interaction device of claim 11, wherein the first at least one computer processor comprises a cryptographic processor.

\* \* \* \* \*